US012072252B2

(12) United States Patent
Chiu

(10) Patent No.: US 12,072,252 B2
(45) Date of Patent: Aug. 27, 2024

(54) GAP-INCREASING CAPACITIVE PRESSURE SENSOR FOR INCREASED RANGE

(71) Applicant: Apple Inc., Cupertino, CA (US)

(72) Inventor: Jeffrey C. Chiu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 17/831,365

(22) Filed: Jun. 2, 2022

(65) Prior Publication Data

US 2023/0098186 A1 Mar. 30, 2023

Related U.S. Application Data

(60) Provisional application No. 63/248,368, filed on Sep. 24, 2021.

(51) Int. Cl.
*G01L 1/14* (2006.01)
(52) U.S. Cl.
CPC .................................. *G01L 1/148* (2013.01)
(58) Field of Classification Search
CPC ....................................................... G01L 1/148
USPC ..................................................... 73/862.626
See application file for complete search history.

(56) References Cited

U.S. PATENT DOCUMENTS

| | | | | |
|---|---|---|---|---|
| 5,357,806 A | * | 10/1994 | Dennis | E21B 47/06 361/283.4 |
| 5,452,268 A | * | 9/1995 | Bernstein | H04R 19/005 381/174 |
| 5,679,902 A | * | 10/1997 | Ryhanen | G01L 9/0073 361/283.4 |
| 6,535,460 B2 | * | 3/2003 | Loeppert | B81B 3/0072 367/181 |
| 6,901,807 B1 | * | 6/2005 | Wang | G01L 9/0072 73/718 |
| 7,912,236 B2 | * | 3/2011 | Dehe | H04R 7/00 381/174 |
| 2009/0041270 A1 | * | 2/2009 | Schrank | H04R 19/04 381/174 |
| 2016/0076959 A1 | * | 3/2016 | Chen | H04R 31/00 438/51 |
| 2016/0337761 A1 | * | 11/2016 | Hall | G01S 3/801 |
| 2018/0113041 A1 | * | 4/2018 | Zheng | G01L 9/0073 |

* cited by examiner

Primary Examiner — Nathaniel T Woodward
(74) Attorney, Agent, or Firm — BakerHostetler

(57) ABSTRACT

Aspects of the subject technology relate to a sensor device including a first cavity and a second cavity separated from the first cavity by a diaphragm. A first plate of the first cavity forms a first electrode of a capacitance. The diaphragm forms a second plate of the first cavity, which is the second electrode of the capacitance. The diaphragm is flexible and can deflect in response to an applied pressure.

22 Claims, 4 Drawing Sheets

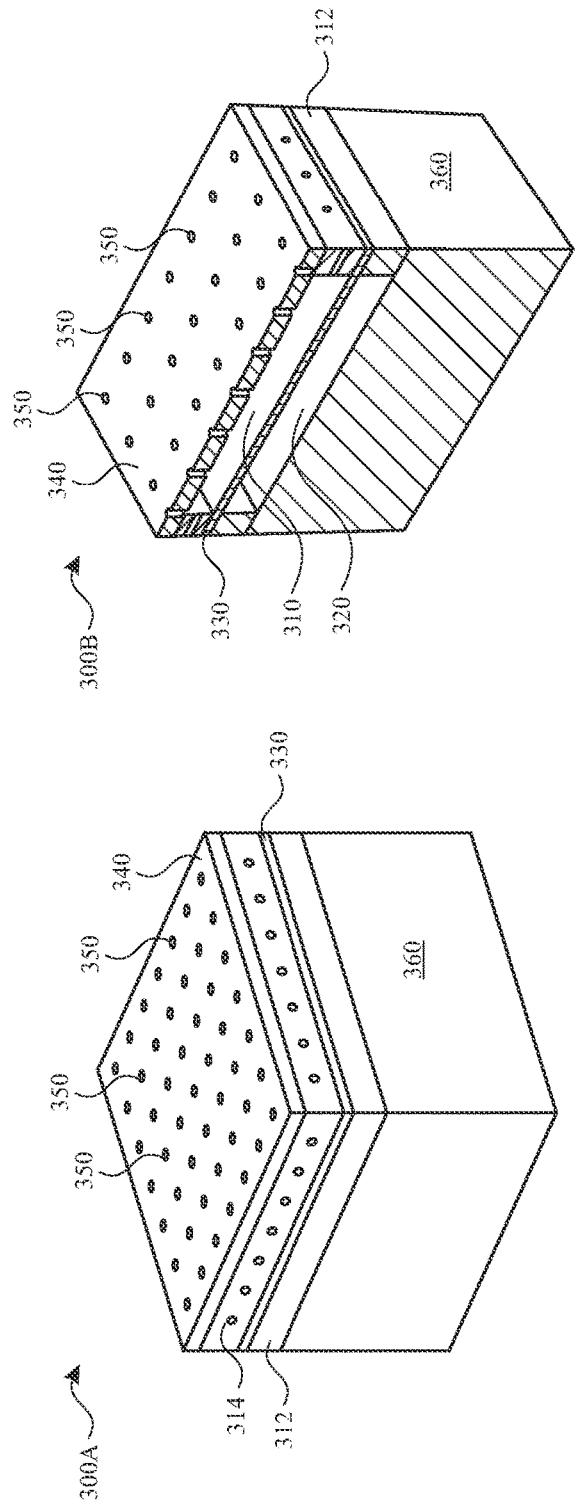
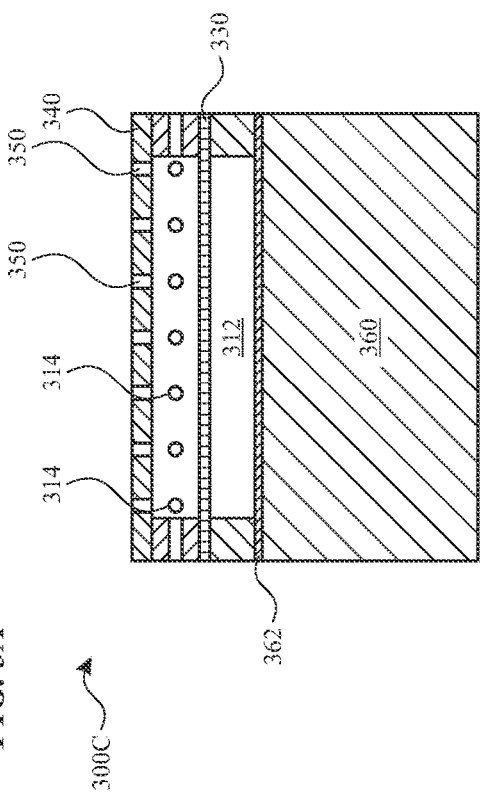
FIG. 3A
FIG. 3B
FIG. 3C

GAP-INCREASING CAPACITIVE PRESSURE SENSOR FOR INCREASED RANGE

CROSS-REFERENCE TO RELATED APPLICATIONS

This application claims benefit of priority from the U.S. Provisional Patent Application No. 63/248,368, filed Sep. 24, 2021, the disclosure of which is incorporated herein by reference in its entireties for any and all purposes.

TECHNICAL FIELD

The present description relates generally to handheld electronic devices, and more particularly, but not exclusively, to a gap-increasing capacitive pressure sensor for increased range.

BACKGROUND

Many mobile electronic devices are equipped with sensors and transducers that enable the devices to perform far more functionalities than communications. Media playing, photography, location detection, online shopping, social media, online banking, calendar and health applications such as heartbeat, blood pressure and blood oxygen level measurement are among the numerous applications that a smart mobile communication device can facilitate. Further, smart mobile communication devices (e.g., smartphones and smartwatches) can be equipped with environmental sensors, such as pressure sensors, humidity sensors and gas sensors.

Existing microelectro-mechanical system (MEMS) pressure sensors have a single diaphragm and a sealed cavity. The MEMS pressure sensors use a diaphragm that deflects to detect a pressure change. In a typical capacitive pressure sensor, the capacitance can change due to a diaphragm deflection. As the pressure increases, the gap between the top electrode (diaphragm) and the bottom electrode (substrate) decreases, which increases the device capacitance. The capacitance is then sensed and translated into pressure.

BRIEF DESCRIPTION OF THE DRAWINGS

Certain features of the subject technology are set forth in the appended claims. However, for purposes of explanation, several aspects of the subject technology are set forth in the following figures.

FIGS. 3A, 3B and 3C are diagrams illustrating an isometric view, an isometric cross-sectional view and a front cross-sectional view showing a structure of a gap-increasing capacitive pressure-sensor apparatus, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The subject disclosure is directed to a gap-increasing capacitive sensor in which the gap distance between the top electrode and the bottom electrode can decrease in response to an applied pressure. The decrease in the gap distance (d) results in an increase in the sensor capacitance ($C=\epsilon A/d$). Portable communication devices such as smartphones or smartwatches may use pressure sensors to measure an altitude (e.g., when the user climbs up a hill or a mountain) or depth (e.g., depth in water). The altitude and/or depth pressure differentials are not always constant, so a high sensitivity is not necessarily needed for all pressure-sensing applications. For example, at the peak of Mount Everest with an elevation of about 8,840 meters, the pressure change per one meter of elevation change is about 4.7 Pascal (Pa), whereas at sea level (0 meters) the pressure change at one meter of elevation change is about 12 Pa, and underwater the change in pressure is about 9,800 Pa per one meter change in depth. This data suggests that less sensitivity is required to discern an altitude and/or depth difference at lower elevations or underwater when compared to high altitudes. Due to the inverse ($1/d$) relationship between capacitance (C) and gap-distance (d), the gap-increasing capacitive sensor of the subject technology will have high sensitivity at low pressures where high sensitivity is required, and low sensitivity at high pressures where less sensitivity is required. Thus, the disclosed gap-increasing capacitive sensor enables measuring a large range of pressures using a single sensor with a single cavity and a membrane and can be used in different applications such as in mountain-climbing applications, sea-level applications and underwater diving applications.

Figure 1:
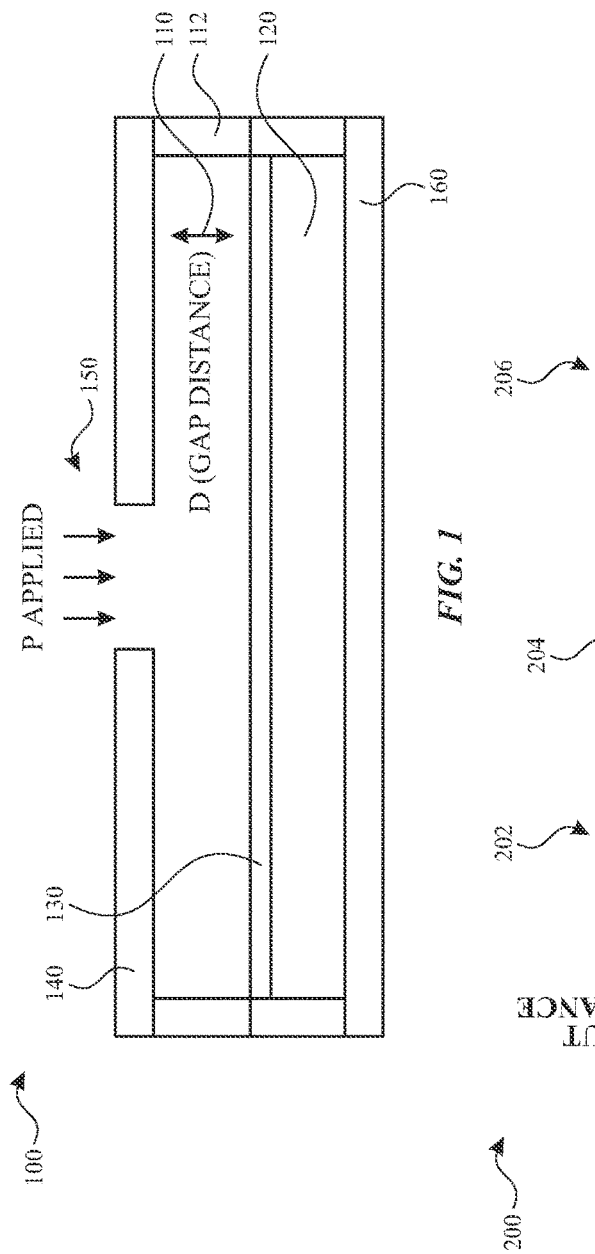
FIG. 1 is a diagram illustrating an example of a gap-increasing capacitive pressure-sensor apparatus, in accordance with various aspects of the subject technology.

FIG. 1 is a diagram illustrating an example of a gap-increasing capacitive pressure-sensor apparatus 100, in accordance with various aspects of the subject technology. The gap-increasing capacitive pressure-sensor apparatus 100 (hereinafter, pressure-sensor apparatus 100) includes a first cavity 110 and a second cavity 120 separated from the first cavity by a diaphragm 130. A first plate (top plate) of the first cavity 110 forms a first electrode 140 of a capacitance. The diaphragm 130 forms a second plate (bottom plate) of the first cavity 110, which is a second electrode of the capacitance. The second plate of the second cavity 120 is a substrate 160.

The diaphragm 130 is flexible and can deflect in response to an applied pressure. The first cavity 110 is exposed to an environment via a port 150 that is configured to equalize a pressure of the first cavity 110 with a pressure of the environment (e.g., surrounding air pressure). The second cavity 120 can be configured to be at a low pressure, for example, near vacuum. The diaphragm 130 can deflect away from the first plate of the first cavity 110 to increase a gap distance between the first electrode 140 and the second electrode (diaphragm 130) in response to the applied pressure (air pressure). The capacitance is a gap-increasing capacitance the value of which decreases with an increase of the applied pressure. The change in the value of the capacitance enables measurement of a wide range of pressures ranging from above-sea-level pressures to underwater pressures.

In one or more implementations, the substrate 160, optionally, includes a third electrode, which in combination with the second electrode (diaphragm 130) forms an auxiliary capacitance. The auxiliary capacitance can be calibrated to provide an additional measurement of the pressure, which can potentially increase the confidence level of the measured-pressure data.

Figure 2:
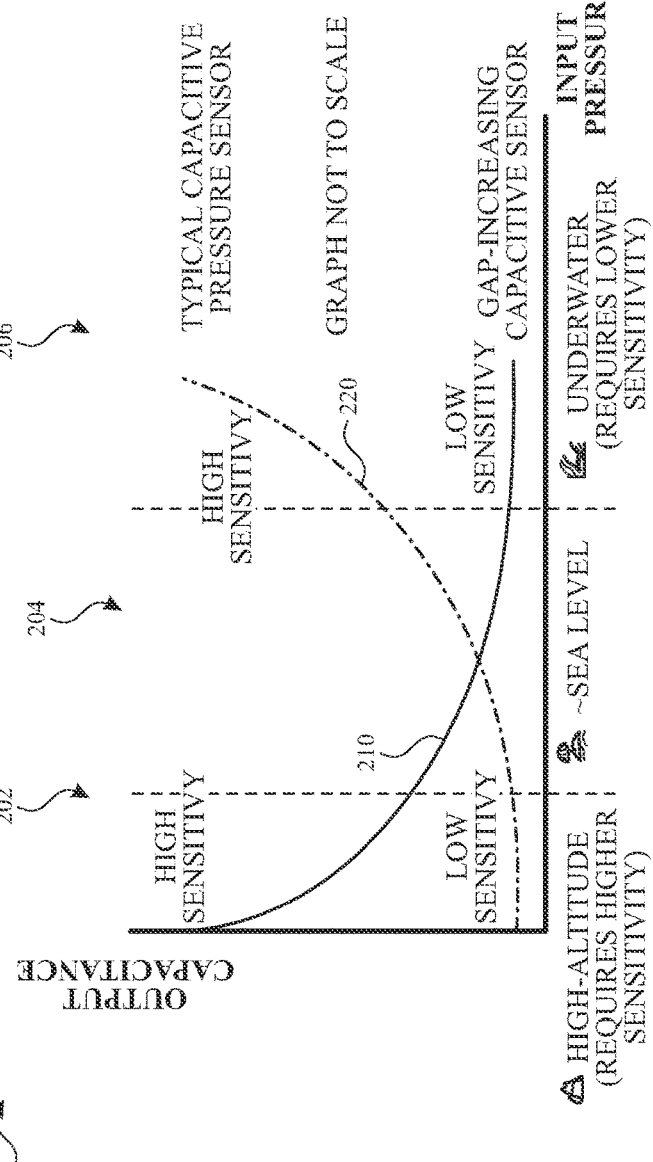
FIG. 2 is a chart illustrating example plots of capacitance versus pressure for the gap-increasing capacitive pressure-sensor apparatus of the subject technology and an existing capacitive pressure sensor, respectively.

FIG. 2 is a chart illustrating example plots 210 and 220 of capacitance versus pressure for the gap-increasing capacitive pressure-sensor apparatus of the subject technology and an existing capacitive pressure sensor, respectively. The horizontal axis represents the sensor input pressure (applied pressure) and is divided into three pressure regions. A first region is the low pressure region 202 associated with a high-altitude region. A second region 204 is a medium-pressure region associated with sea level, and a third region 206 is a high-pressure region associated with underwater. The plot 210 depicts the capacitance versus pressure variation of the pressure sensor device (e.g., 100 of FIG. 1) of the subject technology. The plot 210 shows that the disclosed pressure sensor device has a high sensitivity at the low-pressure region 202 and a low sensitivity at the high-pressure region 220. This conforms with the required sensitivity for these regions. As described above, the pressure gradient per one meter of altitude change is much lower (e.g., 4.7 Pa) at a high altitude (e.g., Mount Everest Peak) than underwater (e.g., 9700 Pa) and thus needs a higher sensitivity that the subject technology provides.

The plot 220 shows that the existing pressure sensor devices have low sensitivity at the low-pressure region 202 and a high sensitivity at the high-pressure region 206. This is clearly opposite to what is required for a wide range of measurement application. Therefore, the plots 210 and 220 clearly reveal the advantages of the disclosed pressure sensor device as compared to the existing solutions and validates the fact that the pressure sensor device of the subject technology has a wide range of pressure measurement applications from high altitudes to underwater environments. This allows a user of a smartwatch or smartphone that includes the disclosed pressure sensor device to be able to obtain pressure data at various altitudes and even underwater.

FIGS. 3A, 3B and 3C are diagrams illustrating an isomeric view 300A, an isomeric cross-sectional view 300B, and a front cross-sectional view 300C showing a structure of a gap-increasing, capacitive, pressure-sensor apparatus, in accordance with various aspects of the subject technology. The isomeric view 300A shows the three-dimensional (3-D) structure of the pressure-sensor apparatus 100 of FIG. 1. The first plate 340 of the first cavity 310 includes an array of holes 350, which operate as the port 150 of FIG. 1 and expose the first cavity 310 to the surrounding environment and allow the pressure of first cavity 310 to be equalized with the pressure of the surrounding environment and transfer that pressure to the diaphragm 330. The first plate 340 is the first electrode of the gap-increasing capacitance of the first cavity 310 and can be made of an electrically conductive material such as silicon nitrate (SiN), silicon oxide ($SiO_2$), gold, silver, copper, aluminum or other suitable materials. The first plate 340 can have a thickness within a range of about 0.5 µm to greater than 1 mm and dimensions within a range of about 10 µm to greater than 10 mm.

In some implementations, the cavity walls 312 of the first cavity 310 and the second cavity 320 are made of silicon. In one or more implementations, the cavity walls 312 in the first cavity region can have holes 314, which have the same pressure equalization effects as the holes 350. The diaphragm 330, which is the second plate of the first cavity 310 can be made of a material such as silicon, glass, polymer, ceramic or other suitable materials. In some implementations, the diaphragm 330 has a thickness within a range of about 0.5 µm to greater than 0.5 mm and dimensions within a range of about 10 µm to greater than 10 mm. The substrate 360 can be made of a material such as silicon, glass, polymer, ceramic or other suitable materials and can have has a thickness within a range of about 100 µm to greater than 10 mm.

FIG. 3B shows the isomeric cross-sectional view 300B, which further reveals the first and second cavities 310 and 320, the first plate 340, cavity walls 312, the diaphragm 330 and the substrate 360.

FIG. 3C shows the front cross-sectional view 300C, which further reveals the diaphragm 330, holes 250, holes 324, cavity walls 312, the substrate 360 and an optional electrode 362. The optional electrode 362 can be made of an electrically conductive material such as silicon nitrate (SiN), silicon oxide ($SiO_2$), gold, silver, copper, aluminum or other suitable materials. The optional electrode 362 and the diaphragm 330 can be used as electrodes of an optional second capacitance within the second cavity 320. The optional second capacitance can be calibrated to provide an additional measurement of the pressure, which can potentially increase confidence level of the measured-pressure data.

Figure 4:
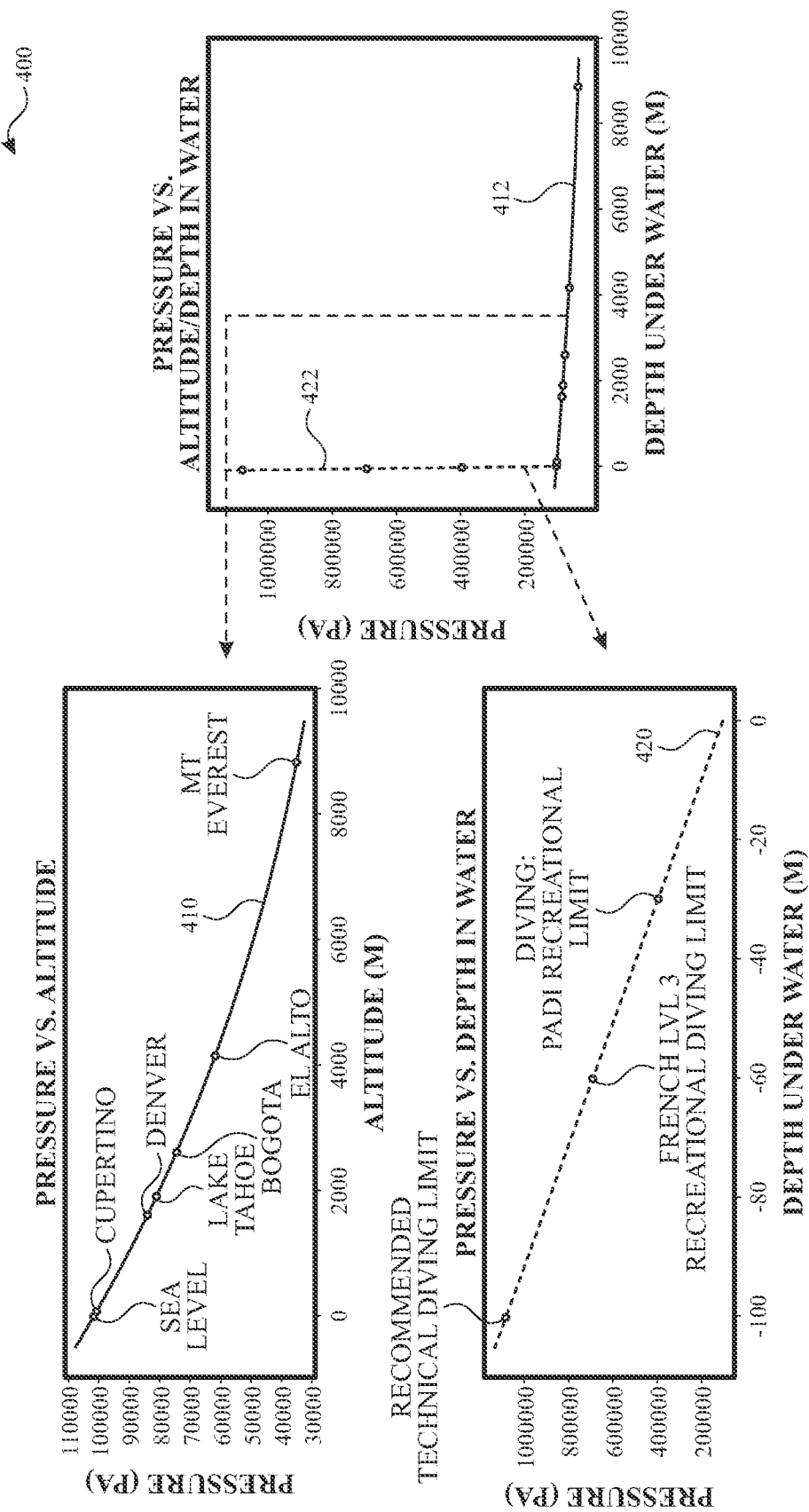
FIG. 4 illustrates charts depicting pressure points of interest that can be measured by the wide-range gap-increasing capacitive pressure-sensor apparatus of the subject technology.

FIG. 4 illustrates charts 400 depicting pressure points of interest that can be measured by the wide-range gap-increasing capacitive pressure-sensor apparatus of the subject technology. The charts 400 includes a plot 410 of the pressure (Pa) versus altitude (m) of a number of above-sea-level locations of interest such as Cupertino (Calif.), Denver, Lake Tahoe (CA), Bogota (Colombia), El Alto (Bolivia) and Mount Everest. The charts 400 further include a plot 420 of the pressure (Pa) versus altitude (m) of a number of underwater locations of interest at depths of about 100 m, 60 m and 30 m. When drawn in a larger linear scale, the plots 410 and 420 are respectively converted plots 412 and 422. The plots 412 and 422 indicate the high- and low-pressure-measurement sensitivity required for the high altitudes and underwater, respectively.

Figure 5:
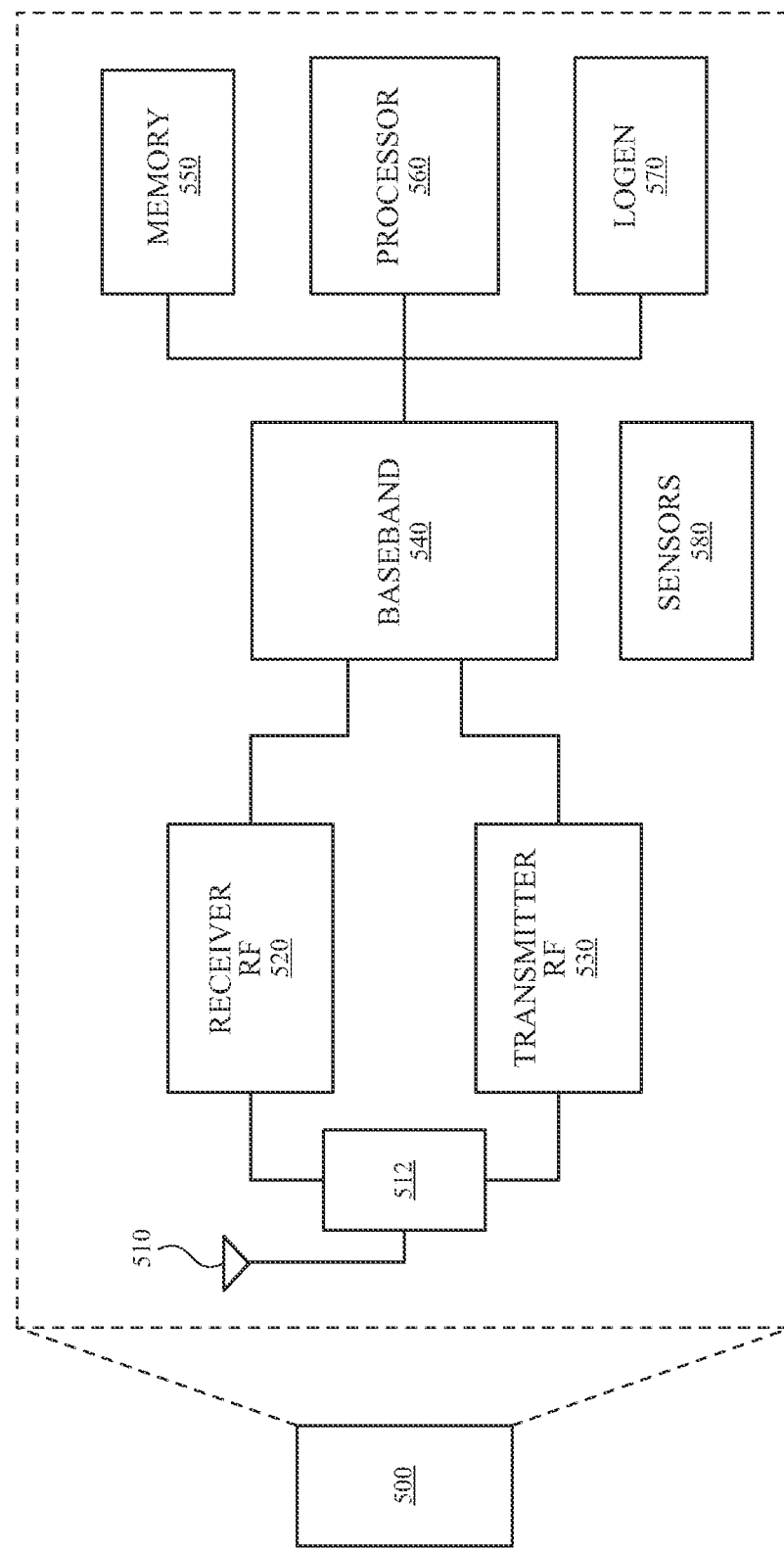
FIG. 5 illustrates a wireless communication device within which some aspects of the subject technology are implemented.

FIG. 5 illustrates a wireless communication device within which some aspects of the subject technology are implemented. In one or more implementations, the wireless communication device 500 can be a smartphone, a smartwatch, a tablet or other electronic devices in which a gap-increasing capacitive pressure sensor of the subject technology may be implemented. For example, the wireless communication device 500 can be the pressure-sensor apparatus 100 of FIG. 1. The wireless communication device 500 may comprise a radio-frequency (RF) antenna 510, a duplexer 512, a receiver 520, a transmitter 530, a baseband processing module 540, a memory 550, a processor 560, a local oscillator generator (LOGEN) 570, and sensors 580. In various aspects of the subject technology, one or more of the blocks represented in FIG. 5 may be integrated on one or more semiconductor substrates. For example, the blocks 520-570 may be realized in a single chip or a single system on a chip or may be realized in a multichip chipset. The wireless communication device 500 can also include a camera, a UWB device, a gyro and a GPS device that can be used to implement some aspect of the subject technology as described above.

The receiver 520 may comprise suitable logic circuitry and/or code that may be operable to receive and process signals from the RF antenna 510. The receiver 520 may, for example, be operable to amplify and/or downconvert received wireless signals. In various aspects of the subject technology, the receiver 520 may be operable to cancel noise in received signals and may be linear over a wide range of frequencies. In this manner, the receiver 520 may be suitable for receiving signals in accordance with a variety of wireless standards such as Wi-Fi, WiMAX, Bluetooth, and various cellular standards. In various aspects of the subject technology, the receiver 520 may not use any sawtooth acoustic wave (SAW) filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to upconvert baseband signals to RF signals and amplify RE signals. In various aspects of the subject technology, the transmitter 530 may be operable to upconvert and amplify baseband signals processed in accordance with a variety of wireless standards. Examples of such standards may include Wi-Fi, WiMAX, Bluetooth, and various cellular standards. In various aspects of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer 512 may be operable in multiple frequency bands of various wireless standards.

The baseband processing nodule 540 may comprise suitable logic, circuitry, interfaces, and/or code that may be operable to perform the processing of baseband signals. The baseband processing module 540 may, for example, analyze received signals and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfer of data between various portions of the wireless communication device 500. Additionally, the processor 560 may enable implementation of an operating system or otherwise execute code to manage operations of the wireless communication device 500.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various aspects of the subject technology, information stored in the memory 550 may be utilized for configuring the receiver 520 and/or the baseband processing module 540.

The LOGEN 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband processing module 540.

The sensors 580 may include one or more of the gap-increasing capacitive pressure sensors of the subject technology, as described with respect to FIG. 1. In one or more implementations, the processor 560 can be used to measure a change in a capacitance value of the gap-increasing capacitor of the sensors 580. In some implementations, the memory 550 may store pressure measurement data associated with the sensors 580.

In operation, the processor 560 may configure the various components of the wireless communication device 500 based on a wireless standard according to which it is designed to receive signals. Wireless signals may be received via the RF antenna 510, amplified, and downconverted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 500, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Various functions described above can be implemented in digital electronic circuitry, as well as in computer software, firmware or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors and storage and memory that store computer program instructions in a machine-readable or computer-readable medium (alternatively referred to as computer-readable storage media, machine-readable media, or machine-readable storage media). Some examples of such computer-readable media include RAM, ROM or flash memory. The computer-readable media can store a computer program that is executable by at least one processing unit and include sets of instructions for performing various operations. Examples of computer programs or computer code include machine code, such as is produced by a compiler, and files, including higher-level code that are executed by a computer, an electronic component, or a microprocessor using an interpreter.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims wherein reference to an element in the singular is not intended to mean "one and only one," unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed is:

1. A sensor device comprising:
   a plate;
   a first cavity; and
   a second cavity separated from the first cavity by a diaphragm,
   wherein the plate forms a first electrode of a capacitance,
   wherein the diaphragm forms a second electrode of the capacitance and is configured to deflect in response to an applied pressure, and
   wherein the second electrode forms an auxiliary capacitance with a third electrode formed along a planar surface of a substrate of the sensor device and coupled to one or more cavity walls formed between the diaphragm and the substrate.

2. The sensor device of claim 1, wherein the first cavity is exposed to an environment via a port that is configured to equalize a pressure of the first cavity with a pressure of the environment.

3. The sensor device of claim 2, wherein the port comprises an array of holes implemented in the plate of the first cavity.

4. The sensor device of claim 1, wherein the second cavity is configured to be at a low pressure near vacuum.

5. The sensor device of claim 1, wherein the diaphragm is configured to deflect away from the plate of the first cavity to increase a gap distance between the first electrode and the second electrode in response to the applied pressure.

6. The sensor device of claim 1, wherein the capacitance comprises a gap-increasing capacitance and a value of the capacitance decreases with an increase of the applied pressure.

7. The sensor device of claim 6, wherein a change in the value of the capacitance is configured to enable measurement of a wide range of pressures ranging from above sea-level pressures to underwater pressures.

8. The sensor device of claim 1, wherein the substrate is formed of a material including at least one of a silicon, a glass, a polymer and a ceramic.

9. The sensor device of claim 1, wherein the third electrode is formed of an electrically conductive material.

10. The sensor device of claim 1, wherein the diaphragm comprises a material including at least one of a silicon, a glass, a polymer and a ceramic.

11. The sensor device of claim 1, wherein a gap distance between the first electrode and the second electrode is within a range of about 0.5 µm to greater than 500 µm depending on an operating range and a sensitivity of the sensor device.

12. The sensor device of claim 1, further comprising a first cavity wall and a second cavity wall, wherein the substrate is coupled to the diaphragm via the first cavity wall and the second cavity wall, and wherein the second cavity is formed between the first cavity wall and the second cavity wall.

13. The sensor device of claim 1, wherein the third electrode comprises an electrode layer disposed on the planar surface of the substrate.

14. A gap-increasing capacitive pressure-sensor apparatus, the apparatus comprising:
   a gap-increasing capacitance formed in a first cavity and configured to measure an applied pressure; and
   a second cavity configured to support a gap-increasing feature of the gap-increasing capacitance,
   wherein the gap-increasing capacitance is formed by a first electrode and a second electrode,
   wherein the second electrode is formed on a first plate of the second cavity, wherein a second plate of the second cavity comprises a substrate of the apparatus, and wherein the second electrode forms an auxiliary capacitance with a third electrode formed along a planar surface of the substrate and coupled to one or more cavity walls formed between the second electrode and the substrate.

15. The apparatus of claim 14, wherein the first electrode is stationary and includes one or more holes to equalize a pressure of the first cavity with a pressure of an environment.

16. The apparatus of claim 15, wherein the first plate of the second cavity comprises a diaphragm that is flexible and is configured to deflect away from the first electrode to increase a gap distance between the first electrode and the second electrode in response to a pressure of the environment.

17. The apparatus of claim 16, wherein the diaphragm comprises a material including at least one of a silicon, a glass, a polymer and a ceramic.

18. The apparatus of claim 14, wherein a change in a value of the gap-increasing capacitance is configured to enable measurement of a wide range of pressures ranging from above sea-level pressures to underwater pressures.

19. The apparatus of claim 14, wherein the substrate is formed of a material including at least one of a silicon, a glass, a polymer and a ceramic.

20. The apparatus of claim 14, wherein the third electrode is formed of an electrically conductive material.

21. A system comprising:
a processor; and
a gap-increasing capacitive pressure-sensor apparatus comprising:
a first cavity including a first electrode and a second electrode; and
a second cavity separated from the first cavity by a diaphragm,
wherein the first electrode is formed on a plate of the first cavity and the second electrode is formed by the diaphragm, wherein the first electrode and the second electrode form a gap-increasing capacitor, wherein a gap distance of the gap-increasing capacitor is changed in response to a pressure, wherein the processor is configured to measure a change in a capacitance value of the gap-increasing capacitor, and wherein the second electrode forms an auxiliary capacitance with a third electrode formed along a planar surface of a substrate of the gap-increasing capacitive pressure-sensor apparatus and coupled to one or more cavity walls formed between the diaphragm and the substrate.

22. The system of claim 21, wherein the pressure comprises a an environment pressure, and wherein the plate of the first cavity includes one or more holes to equalize a pressure of the first cavity with the environment pressure.

* * * * *

UNITED STATES PATENT AND TRADEMARK OFFICE
CERTIFICATE OF CORRECTION

PATENT NO. : 12,072,252 B2
APPLICATION NO. : 17/831365
DATED : August 27, 2024
INVENTOR(S) : Jeffrey C. Chiu It is certified that error appears in the above-identified patent and that said Letters Patent is hereby corrected as shown below:

In the Claims

Column 10, Line 24 (Claim 22): "a an environment" should read --an environment--.

Signed and Sealed this
Nineteenth Day of November, 2024

Katherine Kelly Vidal
*Director of the United States Patent and Trademark Office*